United States Patent [19]

Nakata

[11] Patent Number: 4,928,213

[45] Date of Patent: May 22, 1990

[54] PROJECTOR-TYPE HEAD LAMP FOR VEHICLES

[75] Inventor: Yutaka Nakata, Isehara, Japan

[73] Assignee: Ichikoh Industries, Ltd., Tokyo, Japan

[21] Appl. No.: 298,912

[22] Filed: Jan. 19, 1989

[30] Foreign Application Priority Data

Jan. 20, 1988 [JP] Japan .................................... 63-8545

[51] Int. Cl.[5] .................................................. B60Q 1/00

[52] U.S. Cl. ........................................ 362/61; 362/308; 362/299; 362/328; 362/335

[58] Field of Search .................... 362/61, 80, 308, 299, 362/332, 328, 326, 335

[56] References Cited

U.S. PATENT DOCUMENTS

| | | | |
|---|---|---|---|
| 4,100,594 | 7/1978 | Gould | 362/308 |
| 4,562,519 | 12/1985 | Deves | 362/308 |
| 4,771,372 | 9/1988 | Litetar et al. | 362/299 |
| 4,772,987 | 9/1988 | Kretschmer et al. | 362/61 |
| 4,797,790 | 1/1989 | Brödling et al. | 362/61 |
| 4,814,950 | 3/1989 | Nakata | 362/61 |

FOREIGN PATENT DOCUMENTS

| | | | |
|---|---|---|---|
| 699970 | 12/1965 | Italy | 362/308 |

*Primary Examiner*—Ira S. Lazarus
*Assistant Examiner*—D. M. Cox
*Attorney, Agent, or Firm*—Foley & Lardner, Schwartz, Jeffery, Schwaab, Mack, Blumenthal & Evans

[57] ABSTRACT

The projector-type head lamp for use on vehicles according to the present invention comprises a reflector formed by a concave mirror having two foci, light source disposed near the first focus of the reflector, and convergent lens disposed opposite to the reflector with the second focus of the reflector located at the intermediate position between the lens and reflector. The convergent lens has an optical axis which is also the optical axis of the reflector and a focus located near the second focus of the reflector. There is provided near the focus of the convergent lens a shade which has a cut-off edge nearly in contact with the optical axis to produce a shaped beam. The convergent lens is composed of a frontal surface defined by an aspherical plane and a back surface defined by a flat plane which is so inclined in relation to the optical axis as to be nearer to the focus of the convergent lens as it goes from the upper portion toward the lower portion. Thereby, the color fringes caused by the chromatic aberration of the convergent lens appear within the main illuminated zone below the light-dark limit so that the existence of the color fringes is not conspicuous.

3 Claims, 3 Drawing Sheets

PROJECTOR-TYPE HEAD LAMP FOR VEHICLES

BACKGROUND OF THE INVENTION (a) Field of the Invention:

The present invention relates to a projector-type head lamp for use on vehicles, and more particularly to a projector-type head lamp in which there will not appear on the light-dark limit any color fringes caused by the chromatic aberration of the objective (convergent lens).

(b) Description of the Prior Art:

Heretofore, approaches have been proposed to reduction of the color fringe developed near the light-dark limit as caused by the chromatic aberration of the convergent lens. One of them is disclosed in, for example, the U.S. Pat. No. 4,562,519 in which localized deflector elements are disposed on the back surface of the convergent lens or in the proximity thereof to deflect the light having passed through the upper and lower portions of the convergent lens, thereby reducing the color fringe developed near the light-dark limit. Such localized deflector elements are formed integrally with the convergent lens as parts mounted on the upper and lower portions of the back surface of the convergent lens and permit to reduce partially the intense coloring resulted from the vertical dispersion of the light having passed through the upper and lower portions of the convergent lens, but do not permit to reduce the coloring due to the dispersion of the light passing through the portions including those around the center of the convergent lens. Therefore, there still develops near the light-dark limit in the arrangement disclosed in the U.S. Pat. No. 4,562,519 a color fringe caused by the dispersion of the light having passed through other portions than the upper and lower portions of the convergent lens.

SUMMARY OF THE INVENTION

The present invention has an object to provide a projector-type head lamp in which the color fringes developed as caused by the dispersion of the light passing through the upper and lower portions of the convergent lens as well as the portions including those around the center thereof appear within the main illuminated zone below the light-dark limit so that the color fringes are inconspicuous, and which does not need any complicated lens composition against the chromatic aberration and any means for correction of the latter.

The above-mentioned object of the present invention is attained by providing a projector-type head lamp for use on vehicles, comprising a reflector (having an optical axis, a first focus located near the reflector and a second focus located far from the reflector), a light source disposed near the first focus of the reflector, a convergent lens disposed opposite to the reflector with the second focus of the latter placed intermediate between them, of which the optical axis is nearly coincident with that of the reflector and which has a focus near the second focus of the reflector, and a shade disposed near the focus of the convergent lens and of which the cut line is located near the optical axis of the convergent lens, the convergent lens comprising an aspherical frontal surface and a substantially flat back surface which is gradually nearer to the focus of the frontal surface as it goes from the upper portion toward the lower portion of the convergent lens, whereby all the color fringes caused by the aberration of the convergent lens appear within the main illuminated zone below the light-dark limit so that the color fringes are so inconspicuous as to minimize the affect such as dazzle to the driver of a car running in a opposite direction.

Since the above-mentioned frontal and back surfaces can be easily formed in a single grinding process and the lens configuration is extremely simple, the head lamp according to the present invention can be provided with lower manufacturing costs.

Preferably, the back surface should be so formed that the angle defined between the normal direction and optical-axis direction thereof is within a range of 0.5 to 2.0 deg., and further, to minimization of the affect of the chromatic aberration, the lens should preferably be so designed as to have an F number (=lens focal distance/lens aperture) somewhat smaller than 1 or somewhat larger than 1 (but smaller than 2).

These and other objects and advantages of the present invention will be better understood from the ensuing description made, by way of example, of the embodiments of the present invention with reference to the drawings.

DETAILED DESCRIPTION OF THE PREFERRED EMBODIMENT

Figure 1:
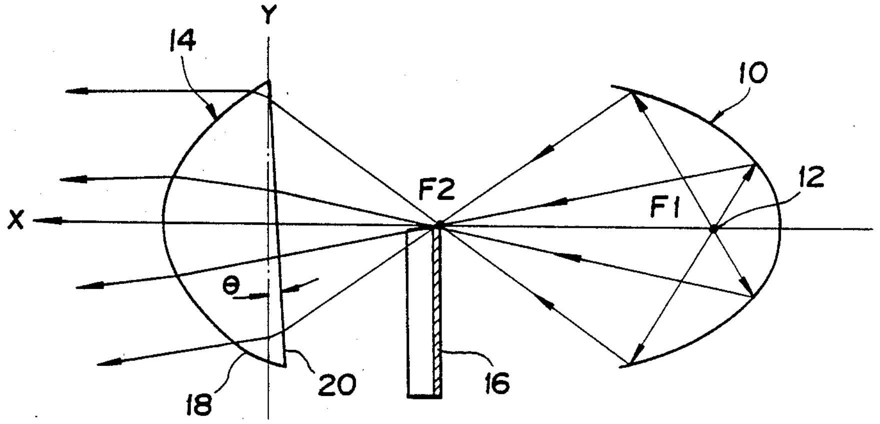
FIG. 1 schematically shows the construction of the projector-type head lamp according to the present invention.
Figure 5:
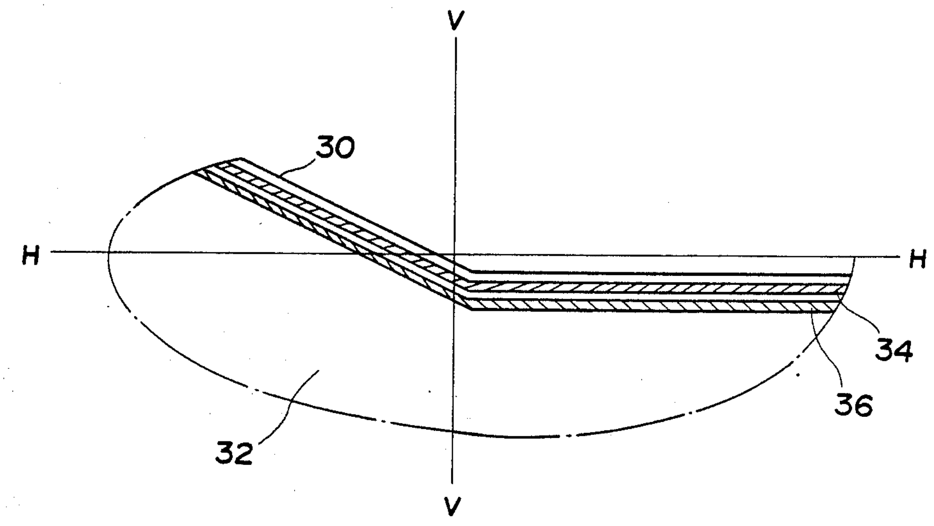
FIG. 5 is an explanatory drawing showing the position of the color fringe caused by the red light and blue light in FIG. 4.

FIG. 1 schematically shows the construction of the projector-type head lamp according to the present invention. In Figure, the reference numberal 10 indicates a reflector having a concave mirror and which has a first focus F1 located within the concave mirror and a second focus F2 located in a position away from the concave mirror. There is disposed within the reflector 10 a light source 12 having a filament positioned near the focus Fl on the optical axis of the reflector 10. A convergent lens 14 peculiar to the present invention is disposed opposite to the light source 12 with the focus F2 of the reflector 10 located in the intermediate position between the convergent lens 14, and the light source 12 and the optical axis of the convergent lens 14 is coincident with that of the reflector 10 (the optical axis is indicated as X-axis in Figures). The convergent lens 14 is so located that its meridional image plane lies near the second focus F2 of the reflector 10. Furthermore, to shape, by cutting off, the light beam emitted from the light source 12 and reflected by the reflector 10, there is provided near the meridional image plane of the convergent lens 14 a shade 16 having a cut-off edge near the second focus F2 of the reflector 10. The light beam thus shaped by the cut-off is projected frontward through the convergent lens 14. As prescribed in, for example, the EC standard, it is projected onto a screen 25 meters before the head lamp along with a light-dark limit 30 corresponding to the cut-off edge of the shade 16 as shown in FIG. 5. In the head lamp according to the present invention, the convergent lens 14 is composed of an aspherical frontal surface 18 and a substantially flat back surface 20 which is gradually nearer to the focus of the convergent lens 14, namely, to the second focus F2 of the reflector 10 as it goes from the upper portion of the convergent lens 14 toward the lower portion thereof. In the conventional projector-type head lamp, a single convex lens of which the back surface is a plane perpendicular to the optical axis is employed as the convergent lens and disposed integrally with or separately from a means of correcting the chromatic aberration of the convergent lens. In the projector-type head lamp according to the present invention, the back surface 20 of the convergent lens is formed by a plane inclined an angle $\theta$ with respect to a plane perpendicular to the optical axis, so that all the color fringes caused by the color aberration appear within the main illuminated zone 32 below the light-dark limit 30.

Figure 2:
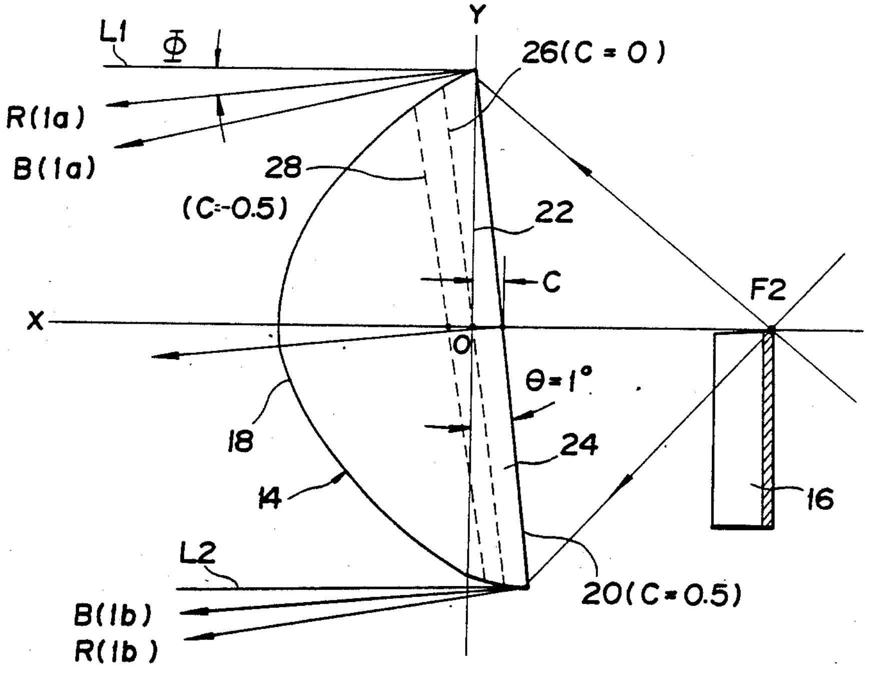
FIG. 2 is a schematic drawing for explanation of the construction and function of the convergent lens according to the present invention.
Figure 3:
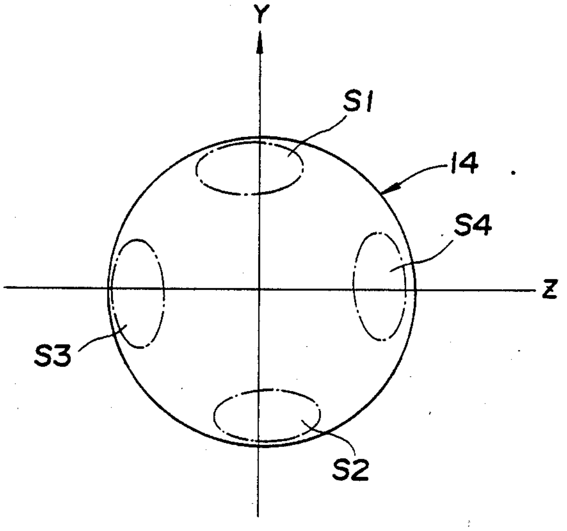
FIG. 3 is a schematic drawing showing the incidence area of the light incident upon the convergent lens.

As shown in FIG. 2, the back surface 20 of the convergent lens 14 in this embodiment is inclined an angle of $\theta=1$ deg. with respect to an imaginary plane 22 perpendicular to the optical axis C (plane in which a Y axis perpendicular to the optical axis X lies as shown) and spaced a distance of C=0.5 mm from the intersection 0 between the imaginary plane 22 and optical axis X. Furthermore, the lens aperture of this lens 14 is 65 mm and focal length is approximately 54 mm. Hence, the F number is about 0.83. In the conventional projector-type head lamp, the convergent lens has a frontal surface which has a nearly same geometrical shape as that of the front surface 18 of the convergent lens 14 of the present invention and a back surface having a same geometrical shape as the above-mentioned imaginary plane 22 of the present invention. However, in case of the convergent lens 14 in the present invention, the geometrical shape of a zone 24 defined by the imaginary plane 22 and back surface 20 takes such a wedge-like form which covers the entire imaginary plane 22, and the upper and lower portions S1 and S2, respectively, of the convergent lens 14, left and right portions S3 and S4, respectively and the whole incidence portions including also the central portion are so arranged that all the color fringes caused by the chromatic aberration appear within the main illuminated zone 32 below the light-dark limit 30. Of the light incident upon the end of the upper portion S1 of the back surface 20 of the convergent lens 14, red light and blue light become a light R (1*a*) and light B (1*a*), respectively, refracted below of the straight line L1 parallel to the optical axis X. Of the light incident upon the lower end of the lower portion S2, both the red light and blue light become a light R (1*b*) and light B (1*b*) refracted below the straight line L2 parallel to the optical axis X. Of the light incident upon the upper portion S1, both the blue light B (1*a*) having outgone, as refracted, from the convergent lens 14 is more largely refracted downward than the red light R (1*a*). On the other hand, of the light incident upon the lower portion S2, the red light R (1*b*) having outgone, as refracted, from the lens 14 is more largely refracted downward than the blue light B (1*b*). Also, of the light incident upon those portions around the center which connect the upper portion S1 and lower portion S2 to each other, both the red light and blue light are deflected below the optical axis, but there is no large difference in direction of deflection between them. Therefore, they are quite inconspicuous because of the strong white light.

In this embodiment, the deflected angles $\phi$ of the red light R (1*a*), blue light B (1*a*), red light R (1*b*) and blue light B (1*b*) are −0.7, −1.71, −1.88 and −0.99 deg., respectively, and the deflected angle $\phi$ of the white light incident upon around and refracted by the central portion is −0.37 deg.

Figure 4:
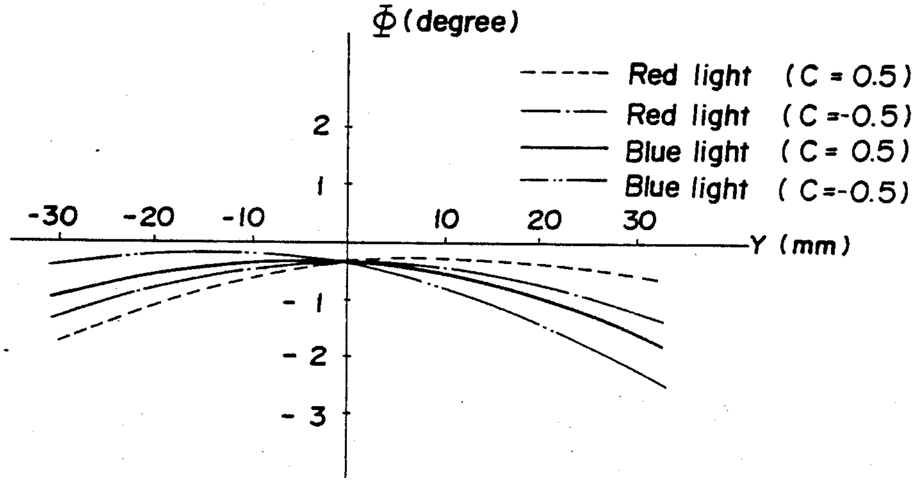
FIG. 4 graphically shows the relation between the positions of incidence of the red light and blue light upon the back surface of the convergent lens.

The back surface 20 of the convergent lens 14 in this embodiment is inclined an angle of $\theta 8=1$ deg. in relation to the imaginary plane 22 perpendicular to the optical axis X and spaced a distance of C=0.5 mm from the intersection O between the imaginary plane 22 and optical axis X. But the back surface 20 may be formed by a plane inclined an angle of $\theta=1$ deg. in relation to the imaginary plane 22 perpendicular to the optical axis and which passes through the intersection O between the imaginary plane 22 and optical axis X. Also it may be formed by a plane inclined an angle of $\theta=1$ deg. in relation to the imaginary plane 22 perpendicular to the optical axis X and which is spaced a distance of C=−0.5 mm from the intersection O between the imaginary plane 22 and optical axis X. These planes are indicated with reference numerals 26 and 28, respectively, in FIG. 2. FIG. 4 shows the positions of light incidence upon the back surface 20 of the convergent lens 14 and the relation in angle $\phi$ of deflection between the refracted red light and blue light in case the back surface 20 is formed by the plane 20 (C=0.5 mm) and the plane 28 (C=−0.5 mm), respectively. The positions of light incidence in these cases fall on the straight line intersecting the Y axis perpendicular to the optical axis X with an angle of $\theta=1$ deg. and they are indicated with their respective distances (on Y-ordinate) from the optical axis X. As seen from FIG. 4, (1) even in case the back surface is formed by a plane of C=−0.5 mm as indicated with the reference numeral 28, the blue light (will be referred to as "B (2*a*)" hereafter) among the light incident upon the upper portion S1 is refracted more largely downward than the red light (will be referred to as "R (2*a*)" hereafter) as in case the back surface is formed by a plane of C=0.5 mm as indicated with the reference numeral 20. Reversely, of the light incident upon the lower portion S2, the red light (will be referred to as "R (2*b*)" hereafter) is refracted more largely downward than the blue light (will be referred to as "B (2*b*)" hereafter), (2) in case the distance C is shorter, both the red light R (2*a*) and blue light B (2*a*), refracted through the upper portion S1 of the convergent lens 14, are deflected at a larger angle than the red light R (1*a*) and blue light B (1*a*) but both the red light R (2*b*) and blue light B (2*b*), refracted through the lower portion S2 of the convergent lens 14, are deflected at a smaller angle than the red light R (1*b*) and blue light B (1*b*), and (3) the above facts (1) and (2) are also true for the red light and blue light which are deflected through those portions around the center which connect the upper and lower portions S1 and S2 to each other.

FIG. 5 explains the positions, on a screen spaced 25 meters from the light source, of color fringes caused by the red light and blue light deflected by the convergent lens 14. The red light R (1*a*) passing by the cut-off edge of the shade 16, being incident upon the upper portion S1 of the convergent lens 14 where it is refracted and deflected somewhat downward and the blue light B (1*b*) incident upon the lower portion S2 where it is refracted and deflected somehow downward appear in a zone 34 a little below and along the light-dark limit 30 of the light distribution pattern, and the blue light B (1*a*) incident upon the upper portion S1 where it is refracted and deflected a little more downward than the red light R (1*a*) and the red light R (1*b*) incident upon the lower portion S2 where it is refracted and deflected a little more downward than the blue light B (1*b*) appear in a zone 36 further below the zone 34. Since all of them appear within the main illuminated zone 32, then are so indistinct that they cannot be recognized as color fringes. Also the red light and blue light deflected at those portions around the center which connect the upper and lower portions S1 and S2 to each other appear within those zones 34 and 36. The red light deflected at the left portion S3 and the blue light deflected at the right portion S4 appear in the left halves of the zones 34 and 36, but they are so indistinct as not to be recognizable as color fringes. The light path is shown for only the red light and blue light, but actually there exist between these light the green light and the white light which cannot be recognized as color fringe. These light appear in a zone between the zones 34 and 36, but they help to make inconspicuous the above-mentioned color fringes caused by the red light and blue light.

In case the back surface is formed by the plane of C=−0.5 mm as indicated with the reference numeral 28, the red light R (2*a*) and blue light R (2*b*) appear in a zone between the between the light-dark limit 30 and the zone 34, and the blue light B (2*a*) appears further below the zone 36.

Also in case the back surface is formed by the plane of C=0 as indicated with the reference numeral 26, both the red light deflected through the upper portion S1 of the convergent lens 14 and the blue light deflected through the lower portion S2 appear in the zone 34, the red light deflected through the lower portion S2 appears adjacently to the top of the zone 34, and the blue light deflected through the upper portion S1 appears somewhat below the zone 36.

As apparent from the comparison among the three back surfaces of C=0.5, 0 and −0.5 mm, in case C=0, the red and blue light deflected at the upper portion S1 and the red and blue light deflected at the lower portion S2 are better balanced in deflection among them, and thus the color fringes are made more inconspicuous.

The back surface of the convergent lens 14 having been describe in the foregoing is inclined an angle of $\theta=1$ deg. in relation to the imaginary plane 22 perpendicular to the optical axis X, but the object of the present invention can be satisfactorily attained if the angle $\theta$ is within a range of 0.5 to 2.0 deg. For further minimization of the influence of the chromatic aberration, the lens design should be preferrably made for the F number to be a little smaller or larger.

What is claimed is:

1. A projector-type head lamp for use on vehicles, comprising a reflector having an optical axis, a first focus located near said reflector and a second focus located far from said reflector, a light source disposed near said first focus of said reflector, a convergent lens disposed opposite to said reflector with said second focus of the latter located at the intermediate position between them, of which the optical axis is nearly coincident with that of said reflector and which has a focus near said second focus of said reflector, and a shade disposed near said focus of said convergent lens and of which the cut line is located near the optical axis of said convergent lens, said convergent lens comprising an aspherical frontal surface and a substantially flat, continuous back surface which is gradually nearer to the focus of said frontal surface as it goes from the upper portion toward the lower portion of said convergent lens, whereby all the color fringes caused by the aberration of said convergent lens appear within the main illuminated zone below the light-dark limit of the light distribution pattern.

2. The projector-type head lamp according to claim 1, wherein the plane defining said back surface of said convergent lens is so formed that the angle formed by a direction perpendicular to the plane with said optical axis is within a range of 0.5 to 2.0 deg.

3. The projector-type head lamp according to claim 2, wherein said convergent lens is so designed as to have an F number smaller than 1 or larger than 1 but smaller than 2 ($F<1$ or $1<F<2$).

* * * * *